United States Patent [19]

Lange et al.

[11] 4,237,260
[45] Dec. 2, 1980

[54] PLASTER CONSISTENCY REDUCER

[75] Inventors: Robert G. Lange, Villa Park, Ill.;
Harley L. Schlotthauer, Okeene, Okla.

[73] Assignee: United States Gypsum Company, Chicago, Ill.

[21] Appl. No.: 49,866

[22] Filed: Jun. 18, 1979

Related U.S. Application Data

[63] Continuation of Ser. No. 893,853, Apr. 6, 1978, Pat. No. 4,184,887.

[51] Int. Cl.$^3$ .................... C08G 6/00; C08G 10/04
[52] U.S. Cl. ........................ 528/230; 106/90; 106/285; 260/29.2 R; 260/505 N; 528/247; 528/265
[58] Field of Search ................ 528/230, 247, 265; 260/29.2 R, 505 N; 106/90, 285

[56] References Cited

U.S. PATENT DOCUMENTS

| | | | |
|---|---|---|---|
| 3,277,162 | 10/1966 | Johnson | 106/90 |
| 3,465,825 | 9/1969 | Hook et al. | 106/90 |
| 3,582,376 | 6/1971 | Ames | 106/90 |
| 3,686,133 | 8/1972 | Hattori et al. | 106/90 |
| 3,847,635 | 11/1974 | Lange et al. | 106/110 |
| 4,028,125 | 6/1977 | Martin | 106/111 |
| 4,125,410 | 11/1978 | Natsuume | 528/265 X |

*Primary Examiner*—Lucille M. Phynes
*Attorney, Agent, or Firm*—K. E. Roberts; R. H. Robinson; S. Kurlandsky

[57] ABSTRACT

An additive for reducing the amount of water necessary in forming a pourable aqueous calcined gypsum slurry, the additive comprising a high potassium salt of a condensation product of naphthalene and sulfonic acid having a molecular weight between about 300 and 3,000. Aqueous plaster slurries containing the additive are pourable, moldable and castable with much less excess water than ordinarily required, resulting in dried cast products of increased strength and other physical property benefits.

4 Claims, No Drawings

PLASTER CONSISTENCY REDUCER

This is a division of application Ser. No. 893,853, filed Apr. 6, 1978 now U.S. Pat. No. 4,184,887.

BACKGROUND OF THE INVENTION

1. Field of the Invention

The present invention relates to the process of a setting calcined gypsum slurry, and is more particularly concerned with a composition for reducing the amount of water necessary in forming a pourable aqueous calcined gypsum slurry to use in making cast or molded products.

2. Prior Art

Plaster (i.e. calcined gypsum) has long been a large volume commercial article of commerce either as various dry plaster compositions to be mixed by the user with water in forming cast gypsum articles or in manufactured products such as gypsum wallboard and cast art objects and the like. Generally, molds or cast gypsum articles are manufactured by dispersing calcined gypsum and additives in sufficient water to form a pourable slurry, casting the slurry into a mold of desired shape, allowing the slurry to set, and drying excess water from the set article.

The gypsum setting reaction involves the reaction of calcium sulfate hemihydrate and water to form calcium sulfate dihydrate. The theoretical water required to convert the calcined gypsum to set gypsum dihydrate is only 18.7% by weight on a pure basis. However, considerable excess water is required to fluidize the calcined gypsum and obtain proper flow of the gypsum slurry in the casting or molding operation. The amount of excess water depends primarily upon the type of plaster particle, whether beta hemihydrate or alpha hemihydrate, and other additives in the plaster composition. Additives conventionally used in minor amounts include accelerators, retarders, fibrous reinforcements, and consistency reducers. Consistency reducing agents are typified by the lignosulfonates, gum arabic, modified starches and other cellulosic derivatives. Ordinarily, plasters produced at different locations from different sources will also vary in their water requirements to form a pourable slurry. Thus, calcined gypsum compositions that are predominantly or substantially beta hemihydrate may have a normal consistency in a range of about 60-90 or more cc. This relates to a water usage of 60-90 cubic centimeters of water per 100 grams of the calcined gypsum in order to form a readily pourable and flowable gypsum slurry. Other calcined gypsum compositions that predominantly contain alpha hemihydrate may have a normal consistency of 34-55 cc. for example.

The use of cellulosic additives as consistency reducers in calcined gypsum plasters have been suggested as early as around 1900.

In the area of another type of inorganic cementitious material, Portland cement, various other materials have been suggested as additives to modify properties of the composition. For example U.S. Pat. No. 3,465,825 suggests the use of the mixed salts of lithium and sodium of the condensation products of mononaphthalene sulfonic acid and formaldehyde as fluid loss control agents in Portland cement compositions. Such compositions are highly alkaline, generally pH 11 and higher, and the use of such additives have been thought to be effective only in highly alkaline media. For certain specific industrial applications it has been possible to combine substantial amounts of Portland cement compositions and plaster compositions. See for example U.S. Pat. Nos. 3,582,376; 3,847,635 and 3,852,081. Such compositions because of their high alkalinity due to the substantial quantities of the Portland cementitious ingredients have taught the utilization of naphthalene sulfonic acid and formaldehyde condensation product consistency reducing additives. However, the available materials of this type have not been entirely effective or satisfactory in non-highly alkaline media and their usage has not been recommended in plaster compositions which have not been adjusted to high alkalinity. In addition attempts to utilize commercially available condensates of this type in plaster compositions has revealed a severe detrimental characteristics of the condensate. Compositions containing substantial amounts of Portland cements are generally a dark grey in color; however, predominantly plaster containing compositions, especially those most usable in the manufacture of pottery and artware objects are very light in color and present a quite pleasing appearance. The addition of commercially available sodium form of naphthalene sulfonic acid and formaldehyde condensates resulted in a brown discoloration developing in the cast article on exposure to sunlight and with time, which discoloration is highly objectionable from a marketing standpoint.

SUMMARY OF THE INVENTION

It has now been found that a highly effective plaster consistency reducing additive which does not cause objectionable cast discoloration may be prepared from commercially available naphthalene sulfonic acid and condensation products by controlled treatment with a basic compound containing potassium such as potassium hydroxide or potassium sulfate.

Accordingly, it is a principal object and advantage of the present invention to provide a plaster consistency reducer which is highly effective in decreasing the amount of water necessary to form a pourable aqueous calcined gypsum slurry on mixing with water and which is not affected by exposure of the set composition to sunlight and which does not require a highly alkaline media for its effectiveness.

It is a further object of the invention to control the amount of water necessary to form a pourable slurry of a calcined gypsum composition. It is still another object of the invention to provide a method for preparing cast gypsum articles using a less amount of water than normally required and to provide a product prepared by the said method having excellent strength and other physical properties including resistance to discoloration on exposure to sunlight.

According to the invention, a composition for reducing the water necessary to form a pourable slurry with powdered plaster compositions is prepared by partially neutralizing a commercially available condensation product of naphthalene sulfonic acid with potassium, there being present at least about 0.10% by weight and preferably about 20-30% by weight potassium as $K_2O$ based on the total weight of the condensation product. Generally from about $\frac{1}{2}$ to about 20 pounds of such additive per ton (2,000 pounds) of dry plaster composition, may be used in various different calcined gypsum compositions, although a range of about 5 to about 15 pounds per ton is preferred.

DESCRIPTION OF THE PREFERRED EMBODIMENTS

The naphthalene sulfonic acid and formaldehyde condensation products, or condensed naphthalene sulfonates as they are sometimes known in the trade, preferred in the present invention are anionic, polymer type dispersing agents supplied as light-colored powders or aqueous solutions having molecular weights varying between 300 and 3,000. They are prepared by condensing an alkylene or naphthalene and an aldehyde such as formaldehyde with sulfonic acids derived from various petroleum cracking processes to yield water and the acid form which is generally neutralized or partly neutralized with sodium hydroxide to give the sodium condensate salt as an article of commerce. The organic structure of the materials has not been completely determined, may be somewhat variable, and does not appear to effect or concern the novel additives contemplated herein. Condensed naphthalene sulfonates suitable for use in the present invention are marketed by a number of companies under various trade names. A number of naphthalene sulfonic acid and formaldehyde condensate materials are manufactured and marketed by Diamond Shamrock under the trademark "LOMAR" and their literature lists chemical analysis and physical characteristics for a broad range of molecular sizes in the acid form or the sodium salt form. Other condensed naphthalene sulfonates suitable for use in forming the additive of the present invention are produced by W. R. Grace and Company under the trademark "DAXAD" and their analysis and properties are produced in their technical literature.

The additives of the present invention are conveniently formed generally by partly neutralizing any of the available condensed naphthalene sulfonates with a basic material containing potassium such as potassium hydroxide. It does not appear necessary to effectuate complete neutralization or replacement of other salt forms with the potassium forms; and it has been found completely satisfactory to merely provide for the presence of potassium in an amount from about 0.10 to 30% by weight of the condensate. Such may be accomplished by any convenient means such as dissolving potassium hydroxide or potassium sulfate into the liquid acid form of the condensation product and drying and pulverizing the materials by any suitable means such as spray drying or conventional drying and grinding to form pulverulent materials or such means such as solubilizing the available powdered salt condensed naphthalene sulfonate such as the sodium form with aqueous potassium hydroxide followed by drying and grinding of the mixture of potassium and condensate mixtures.

DESCRIPTION OF SPECIFIC EMBODIMENTS

The plaster compositions may be based upon any conventional calcined gypsum material including alpha calcium sulfate hemihydrate and beta calcium sulfate hemihydrate formed by various procedures. Such materials may be derived by calcination of natural gypsum rock or as a by-product of various chemical processes. The calcined gypsum compositions may contain typical additives conventionally used in minor amounts to modify properties hereof for preferred commercial products.

The manner and order of incorporating the potassium form naphthalene sulfonate condensates of the invention with the calcined gypsum is not critical. Thus the condensate may be mixed with the dry calcined gypsum or the already formed aqueous slurry of calcined gypsum. The condensate may be added either separately or together with conventional additives to the calcined gypsum in forming dry packaged industrial plaster compositions, or metered in powdered or water solubilized form into the aqueous slurry separately from or in combination with conventional additives during gypsum casting or molding operations.

In order to meet consistency and physical property requirements, particularly high density, high strength, and high surface hardness requirements necessary to the usage requirements in industrial molding, pottery and art plaster industries, many of the plaster compositions for industrial casting are formulated with blends of beta calcium sulfate hemihydrate and alpha calcium sulfate hemihydrate, commonly referred to as "alpha gypsum." Alpha gypsum is known for its lower water requirements and resultant set cast higher density, higher strength, and higher surface hardness set cast. However, it is also known for its scarcity in production and commands a premium price because of special production requirements necessary to obtain this form of calcined gypsum.

In a series of evaluations, special industrial casting plaster composition formulations were modified to substitute small amounts of the water reducing agent of the present invention or an unmodified condensed naphthalene formaldehyde sulfonate into commercial products or the plaster bases for such products then evaluated with respect to physical properties, water absorption and cast discoloration.

EXAMPLE 1

In a first series of evaluations the commercially available LOMAR D sodium salt form of condensed naphthalene sulfonate was treated to partially replace the sodium with potassium in determining consistency reducing efficiency in a plaster composition of alpha calcined gypsum without the usual additives for commercial plaster formulations.

To incorporate the various amounts of potassium salt, 50 gram aliquots of the commercial condensate LOMAR D, sodium salt form of naphthalene sulfonic acid and formaldehyde condensate which is a powder containing sodium equivalents of up to 11% $Na_2SO_4$, were dissolved in 200 cc. of deionized water. The water was at room temperature, and the condensate was completely solubilized in the water. Varying amounts of potassium hydroxide or potassium sulfate were then added to the water solubilized condensate and thoroughly blended in a high speed mixer for 15 minutes. The resulting mixture was then dried at 250° F. to dryness and the resulting powder was ground to pass a 50 mesh (U.S. Standard) sieve. The thoroughly dried and crushed mixture was added in various amounts to an alpha calcined gypsum plaster base and evaluated for reduced water requirements (measured as normal consistency to achieve a pourable slurry) and setting time by standard hand set 300 gram Vicat set (ASTM C-472).

Table I

| Formulation | Addition Level* | Normal Consistency | Setting Time |
|---|---|---|---|
| Control A - Alpha Gypsum | — | 35–36½ | 20–30 |
| Alpha Gypsum | | | |

Table I-continued

| Formulation | Addition Level* | Normal Consistency | Setting Time |
|---|---|---|---|
| with Potassium Addition at: | | | |
| #5 - 5% KOH | 5 | 26 | 17 |
| #6 - 5% KOH | 10 | 19.5 | 14 |
| #7 - 5% KOH | 15 | 19 | 20 |
| #8 - 1% KOH | 5 | 27.5 | 18 |
| #9 - 1% KOH | 10 | 21 | 13 |
| #10 - 1% KOH | 15 | 19 | 13 |
| #11 0.5% KOH | 5 | 27.5 | 13 |
| #12 - 0.5% KOH | 10 | 22 | 13 |
| #13 - 0.5% KOH | 15 | 19 | 10.5 |
| #14 - 0.25% KOH | 5 | 27.5 | 15 |
| #15 - 0.25% KOH | 10 | 22 | 13 |
| #16 - 0.25% KOH | 15 | 19 | 11 |
| #17 - 5% $K_2SO_4$ | 5 | 27.5 | 15 |
| #18 - 5% $K_2SO_4$ | 10 | 20.5 | 10 |
| #19 - 5% $K_2SO_4$ | 15 | 18 | 9 |
| #20 - 1% $K_2SO_4$ | 5 | 27.5 | 13.5 |
| #21 - 1% $K_2SO_4$ | 10 | 21.5 | 10 |
| #22 - 1% $K_2SO_4$ | 15 | 18.5 | 9 |
| #23 - 0.25% $K_2SO_4$ | 5 | 27.5 | 13 |
| #24 - 0.25% $K_2SO_4$ | 10 | 21.5 | 8 |
| #25 - 0.25% $K_2SO_4$ | 15 | 18.5 | 7.5 |

*lbs./ton (2,000 lbs.)

Typical results are set forth in Table I, reporting various amounts by weight of potassium hydroxide or potassium sulfate added to the aqueous mixture. From Table I it is quite clear that very little potassium augmentation need be provided to the sodium salt form of condensate in order to achieve very substantial reductions in water requirements. Quite surprisingly, at each usage level of the additive of the invention as set forth in Table I substantially the same water reduction effect was obtained regardless of the amount of potassium provided for replacement of sodium salt in the condensate.

EXAMPLE 2

In another series of evaluations a high potassium salt form of the condensate of the invention was compared to the high sodium salt form of condensed naphthalene sulfonate using commercially available forms of LOMAR D, the one form containing 22.5% potassium as $K_2O$ and the other containing 21% sodium as $Na_2O$. They were evaluated in a low consistency high strength commercial casting plaster containing alpha gypsum.

For the first evaluation the commercial plaster composition, Control B, was augmented with those amounts of the condensate salt addition as would provide almost the same consistency reduction and evaluated for physical properties, as set forth in Table II.

TABLE II

| | Commercial Alpha Gypsum Composition (Control B) | Plus Condensate | |
|---|---|---|---|
| | | Sodium | Potassium |
| Additive | — | 11 lbs./ton | 5 lbs./ton |
| Normal Consistency | 35 cc. | 27 cc. | 28 cc. |
| Set Time | 21 minutes | 25 minutes | 25 minutes |
| Time of Temperature Rise After Set | 28 minutes | 34 minutes | 36 minutes |
| Dry Cast Compressive Strength | 7579 p.s.i. | 11992 p.s.i. | 12500 p.s.i. |
| Dry Cast Density lbs./cubic foot | 102.3 | 117.4 | 116.0 |
| Two Week Slab Discoloration | | | |
| Wet | None | Considerable | Very Slight |
| Dry | None | Considerable | Very Slight |

From Table II it can be seen that in order to achieve the same consistency results with the sodium form, the addition level had to be increased to 11 pounds per ton compared to 5 pounds per ton for the potassium form. This is a substantial jump in usage requirements in order to obtain substantially equivalent performance.

In order to meet usage requirements in the industrial molding, pottery and art casting industry, plaster compositions must not only provide high compressive strength but also must be resistant to sunlight discoloration, staining, and water absorption.

To evaluate for discoloration, the alpha calcined gypsum plaster base of the industrial casting plaster composition was evaluated by adding varying amounts of the condensates to the plaster base and mixing with water. The slurry was then formed into rectangular slabs measuring 3 inches by 14 inches by ⅜ inch and exposed to sunlight for a two week period of time. Some of the samples were placed immediately after demolding on a window ledge that received sunlight all day and reported as "wet" results while duplicate samples were oven dried to constant weight before placing in sunlight and reported as "dry" results. Results are set forth in Table II as "two week slab discoloration" results. The sodium form resulted in discoloration of the cast that would be commercially objectionable while the potassium form condensate of the invention did not.

In another evaluation in this series, varying amounts of the condensate were added to the plaster base of the gypsum composition and evaluated for water consistency reduction as set forth in Table III.

TABLE III

| Formulation | Usage Level | Consistency | Consistency Change From Control |
|---|---|---|---|
| Control C (Plaster base of Control B) | — | 35 cc. | — |
| Sodium Salt Condensate (21% $Na_2O$) | 5 lb./ton | 31 cc. | −11% |
| | 10 lb./ton | 29 cc. | −17% |
| | 15 lb./ton | 27 cc. | −22% |
| Potassium Salt Condensate (22.5% $K_2O$) | 5 lb./ton | 31 cc. | −11% |
| | 10 lb./ton | 23 cc. | −34% |
| | 15 lb./ton | 20 cc. | −42% |

It may be clearly seen from Table III that the potassium condensate of the invention additive was much more effective in reducing water requirements at the same levels of usage as the sodium salt condensate. Each of the 10 and 15 pound per ton addition levels of the potassium salt condensate effectuated twice as much change in consistency over the control as did the comparable sodium salt condensate. Further, it may be extrapolated from Tables II and IV that the sodium salt form at the higher usage levels would be commercially objectionable for providing discoloration of cast articles.

In another evaluation in this series two different high strength low consistency industrial casting plaster formulations containing alpha gypsum were compared to a plaster of Paris plaster composition containing customary additives and further including either the preferred potassium condensate additive of the invention or its most comparable sodium salt form condensate, LOMAR D condensate and the samples evaluated for physical properties as set forth in Table IV.

TABLE IV

| Formulation Ingredients | Control D | 1 | 2 | Control E | 3 | 4 |
|---|---|---|---|---|---|---|
| Commercial Industrial Plaster | 100% | — | — | 100% | — | — |
| Plaster Of Paris Composition | — | 99.92% | 99.92% | — | 99.94% | 99.94% |
| Condensate - Sodium Salt (21% $Na_2O$ assay) | — | .08% | — | — | .06% | — |
| Condensate - Potassium Salt (22% $K_2O$ assay) | — | — | .08% | — | — | .06% |
| Properties | | | | | | |
| Normal Consistency cc | 59 | 59 | 59 | 62 | 60 | 60 |
| Set Time - Minutes | 22 | 22 | 19 | 21 | 17 | 16 |
| Temp. Rise[1] | 17 | 17 | 19 | 25 | 17 | 18 |
| Dry Cast Compressive Strength psi | 2,998 | 2,802 | 2,723 | 2,888 | 2,820 | 2,762 |
| Dry Cast Density lb/cu ft | 72.5 | 72.2 | 71.6 | 72.9 | 72.7 | 72.3 |
| Setting Expansion Ring Test[2] | 0.174% | 0.187% | 0.216% | 0.238% | 0.196% | 0.227% |
| Water Absorption cc/min. | 2.75 | 4.90 | 2.65 | — | — | — |
| Weight Gain[3] at 5 min. | 22.5% | 24.1% | 21.3% | | | |
| 10 min. | 23.8% | 26.1% | 22.9% | | | |
| 15 min. | 24.1% | 27.4% | 24.3% | | | |
| 30 min. | 25.4% | 28.7% | 25.6% | | | |
| 1 hour | 26.4% | 29.1% | 26.3% | | | |
| Wet-Out/Dry-Out[4] % wt. loss | 3.9% | 3.8% | 4.0% | | | |

| | Control D | 1 | 2 |
|---|---|---|---|
| Two Week Slab Discoloration | | | |
| Wet | None | Considerable | Slight |
| Dry | None | Considerable | Very slight |

[1] Temperature rise at: the time in minutes to reach the maximum temperature during the exothermic hydration of calcined gypsum setting to hydrated gypsum is indicative of the point in the reaction at which almost all of the plaster has rehydrated and the sample has obtained its maximum wet strength. Determined by casting a sample to a breadth of 2 inches in a container as described in ASTM C-472 and portionate with the thermocouple in an insulated cabinet then measuring the time during which the temperature rises.

[2] Ring test: simulates water absorption characteristics to give an indication of dewatering rate. The plaster is cast into a 2 inch cube shape, oven dried to constant weight and cooled to room temperature in a sealed bag to prevent moisture pick-up. Then placed on a flat surface within a 1 inch inside diameter by 1 inch high aluminum ring secured to the surface with a rope or modeling clay. Water (10 cc.) is poured into the ring and timed for absorption into the cast sample. If leakage under the ring is observed, the test is discontinued. The absorption rate into the sample is obtained by dividing 10 cc. by the elapsed time for the water to absorb into the cast sample and the value reported is the average of duplicate evaluations.

[3] Weight gain: Compares relative absorption rates of samples when 2 inch cubes of the sample materials are fully emersed in water for 1 hour. Prior to emersion, samples are dried to constant weight, cooled to room temperature in a sealed plastic bag, then weighed to a 1 gram accuracy. Thereafter the samples are placed in an appropriate sized container to be completely covered with water throughout the 1 hour period of time. At 5 minute intervals, the sample is removed from the water, lightly blotted with a towel and weighed to the nearest gram, then returned to the water. Absorption rate as percentally gained is determined by subtracting the initial dry weight from the wet weight at the timed interval, dividing by the initial dry weight and multiplying by 100.

[4] Wet-out dry-out tests were conducted on oven dried 2 inch cubes by weighing the dried cubes, fully emersing them in water for 4 hours, reweighing them, then drying the samples for 20 hours in a 110° F. oven and reweighing again. This procedure is continued for a 2-week period to determine if the formulations eroded at comparable rates to simulate manner in which they may erode in pottery shop usage.

From Table IV it may be clearly seen that the potassium additive provided greater resistance to discoloration and less water absorption in plaster compositions for industrial casting while maintaining other physical properties at acceptable levels.

EXAMPLE 3

As set forth in Tables III and IV above additives may be included in their conventional amounts for their usual purposes, such as accelerators, retarders, defoamers and the like. Other adjuvants in more major amounts may also be added without deliterious affects in the use of the additives of this invention. For example, Portland cement may be added in varying amounts without deleterious affects. In fact there appears to be an enhanced consistency efficiency with the condensate of the invention, at least at low levels of Portland cement augmentation to calcined gypsum plaster of Paris compositions, as set forth in Table V.

TABLE V

| Formulation: | Alpha Gypsum Plus 5% Portland Cement (Control E) | Additive Addition Level | |
|---|---|---|---|
| | | Sodium 11 lb./ton | Potassium 5 lb./ton |
| Properties | | | |
| Normal Consistency (cc.) | 40 | 27 | 28 |
| Setting Time (Minutes) | 20 | 25 | 25 |
| Time of maximum Temperature Rise After Set (minutes) | 20 | 26 | 19 |
| Dry Density (lbs./cubic ft.) | — | 123 | 125.7 |
| Dry Compressive Strength | 6125 | 12,217 | 13,866 |
| Set Expansion | 0.250% | .255% | .277% |
| Two Week Slab Discoloration | | | |
| Wet | None | Considerable | None |
| Dry | None | Considerable | None |

What is claimed is:

1. A plaster consistency reducing agent for reducing the amount of water required to be mixed with a dry plaster composition to form a pourable aqueous slurry consisting essentially of a potassium salt of naphthalene sulfonic acid condensate having a molecular weight between about 300 and 3,000, the potassium being present in an amount of about 0.10% to about 30% by weight expressed as $K_2O$, by weight of the condensate.

2. The plaster consistency reducing agent of claim 1 containing about 10% to about 30% potassium expressed as $K_2O$.

3. The plaster consistency reducing agent of claim 1 in which the condensate is naphthalene sulfonic acid formaldehyde condensate and contains about 0.10% to about 30% by weight of the condensate of potassium expressed as $K_2O$.

4. The plaster consistency reducing agent of claim 1 comprising the product of solubilizing a naphthalene sulfonic acid condensate in water with about 0.1% to about 5% by weight of a basic potassium compound selected from the group consisting essentially of potassium sulfate and potassium hydroxide; drying the solubilized material to a solid; and grinding the solid to a powder.

* * * * *